US011518338B1

(12) United States Patent
Montgomery et al.

(10) Patent No.: US 11,518,338 B1
(45) Date of Patent: Dec. 6, 2022

(54) AUTOMOTIVE AIRBAG SYSTEMS WITH A SECUREMENT WRAPPER AND A PACKAGING WRAPPER

(71) Applicant: Autoliv ASP, Inc., Ogden, UT (US)

(72) Inventors: Douglas Glenn Montgomery, Layton, UT (US); Naoki Morita, Farmington, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/647,945

(22) Filed: Jan. 13, 2022

(51) Int. Cl.
*B60R 21/2165* (2011.01)
*B60R 21/2338* (2011.01)
*B60R 21/201* (2011.01)
*B60R 21/207* (2006.01)
*B60R 21/231* (2011.01)

(52) U.S. Cl.
CPC ........ *B60R 21/2165* (2013.01); *B60R 21/201* (2013.01); *B60R 21/207* (2013.01); *B60R 21/2338* (2013.01); *B60R 2021/23146* (2013.01); *B60R 2021/23169* (2013.01)

(58) Field of Classification Search
None
See application file for complete search history.

(56) References Cited

U.S. PATENT DOCUMENTS

| | | | | |
|---|---|---|---|---|
| 7,980,585 B2 * | 7/2011 | Cheal | ................... | B60R 21/201 |
| | | | | 280/730.2 |
| 9,744,934 B2 * | 8/2017 | Lafferty | ................ | B60R 21/201 |
| 10,000,176 B2 * | 6/2018 | Buelow | .................... | B60N 2/58 |
| 11,299,120 B1 * | 4/2022 | Morita | ................. | B60R 21/201 |
| 11,377,059 B2 * | 7/2022 | Dinsdale | ............... | B60R 21/207 |
| 2013/0341975 A1 * | 12/2013 | Schneider | ................ | B60N 2/01 |
| | | | | 297/216.13 |
| 2014/0375024 A1 * | 12/2014 | Osterfeld | ............ | B60R 21/2176 |
| | | | | 280/728.2 |
| 2021/0138991 A1 * | 5/2021 | Baldreus | ........... | B60R 21/23138 |
| 2021/0316693 A1 * | 10/2021 | Silverwood | ....... | B60R 21/23138 |
| 2022/0274556 A1 * | 9/2022 | Sandinge | .............. | B60R 21/207 |

FOREIGN PATENT DOCUMENTS

ES 2368112 T3 * 11/2011 ........... B60R 21/201

* cited by examiner

*Primary Examiner* — Faye M Fleming
(74) *Attorney, Agent, or Firm* — Foley & Lardner LLP

(57) ABSTRACT

An inflatable airbag system is disclosed, the inflatable airbag system configured with a securement wrapper and a packaging wrapper, the securement wrapper retaining an inflatable airbag cushion of the inflatable airbag system in a packaging state during assembly of the packaging wrapper to the inflatable airbag system. The securement wrapper prevents or reduces the incidence of excursion of the inflatable airbag cushion from the appropriate packaging state during assembly.

20 Claims, 10 Drawing Sheets

AUTOMOTIVE AIRBAG SYSTEMS WITH A SECUREMENT WRAPPER AND A PACKAGING WRAPPER

TECHNICAL FIELD

The present disclosure relates generally to the field of automotive protective systems. More specifically, the present disclosure relates to airbag systems that are configured to deploy in response to collision events.

BACKGROUND

Inflatable airbags may be mounted within a vehicle and deploy during a collision event. The deployed airbag may cushion an occupant and prevent detrimental impact with other vehicular structures. Some airbags suffer from one or more drawbacks during deployment due to an assembly error or may be rejected due to an assembly failure prior to installation in a motor vehicle. Certain embodiments disclosed herein can address one or more of these issues.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not to be considered limiting of the scope of the disclosure, the embodiments will be described and explained with specificity and detail in reference to the accompanying drawings.

DETAILED DESCRIPTION

Figure 1:
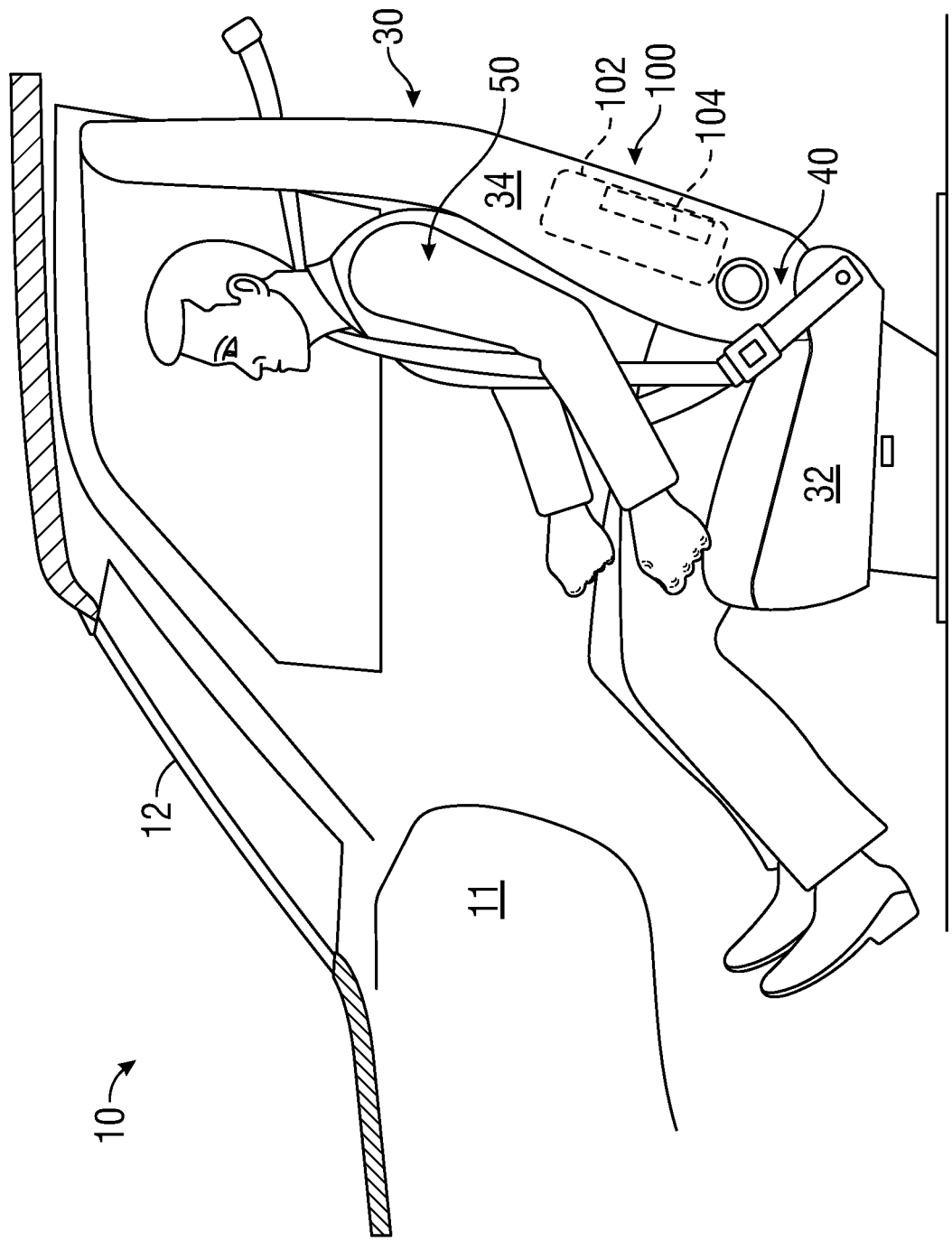
FIG. 1 is a side view of a portion of an interior of a vehicle wherein an inflatable airbag assembly is installed, according to one embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag systems are used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable airbag, such as, for example, an airbag that is typically housed within a side of a seat, although the principles discussed may apply to other types of airbags (e.g., airbags housed within the steering wheel, knee airbags, side airbags, side curtain airbags, lower frontal airbags, etc.).

During assembly, the disclosed airbags are typically rolled, folded, or otherwise configured to a compressed state prior to disposition within a housing and installation in a motor vehicle. During installation, the disclosed airbags are typically disposed at an interior of a housing in a packaged state or a compact configuration and may be retained in the packaged state behind a cover. During a collision event, an inflator is triggered, which rapidly fills the airbag with inflation gas. The airbag can rapidly transition from the packaged state of the compact configuration to an expanded state of a deployed configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors. In some existent methods for installing an inflatable airbag assembly in a vehicle, a hinge of a closure behind where the inflatable airbag assembly is to be disposed, may impair deployment of an inflatable airbag cushion in a collision event. Other features (factory-installed or otherwise) disposed adjacent or near an inflatable airbag assembly may similarly impair deployment of an inflatable airbag cushion in response to a collision event.

An airbag assembly can mitigate injury to an occupant of a vehicle during a collision event by reducing the effect of impact of the occupant against structures (body-structure impact) within the vehicle (such as, e.g., a dashboard, or door column, etc.). More particularly, an embodiment of the present disclosure may reduce or eliminate impairment of deployment or deployment failure of an inflatable airbag cushion due to erroneous configuration of the airbag cushion to a configured state during assembly.

Throughout this specification, the phrase "coupled to" refers to any form of interaction between two or more entities, including mechanical, electrical, magnetic, electromagnetic, fluid, and thermal interaction. Two components may be coupled to each other even though they are not in direct contact with each other.

As used herein, the terms "dashboard" and "instrument panel" refer to a rearward (relative to a front of a vehicle) protruding region of a vehicle faced by a motor vehicle occupant, which often includes a glove compartment in a portion thereof that faces a passenger and may include instruments (e.g., radio and/or climate controls) in a more central region thereof, although such instruments need not be present.

The phrases "attached to" or "attached directly to" refer to interaction between two or more entities that are in direct contact with each other and/or are separated from each other only by a fastener of any suitable variety (e.g., mounting hardware or an adhesive).

The terms "a" and "an" can be described as one, but not limited to one. For example, although the disclosure may recite an airbag having "a chamber," the disclosure also contemplates that the airbag can have two or more chambers.

The terms "longitudinal" and "longitudinally" refer to a direction or orientation extending or spanning between a front of a vehicle and a rear of the vehicle.

As used herein, the terms "forward" and "rearward" are used with reference to the front and back of the relevant vehicle. For example, an airbag cushion that deploys in a rearward direction deploys toward the back of a vehicle. Furthermore, other reference terms, such as horizontal, are used relative to a vehicle in which an airbag assembly is to be installed, unless it is clear from context that a different reference frame is intended. Thus, a term such as "horizontal" is used relative to the vehicle, whether or not the vehicle itself is oriented horizontally (e.g., is positioned upright on level ground) or angled relative to true horizontal (e.g., is positioned on a hill).

The phrase "occupant position" refers to the position in which an occupant is generally positioned when in a vehicle. The term "occupant" refers to a person or crash test dummy within a vehicle.

The phrase "occupant seat" refers to a feature of an occupant position affording an occupant a means of being seated in the occupant position.

The phrases "in a packaging state" and "in the packaging state," as used herein, refer to a preinstallation condition of an inflatable airbag cushion. More particularly, a packaging state is a condition of the inflatable airbag cushion during assembly, such as, e.g., cutting of a fabric panel to become an inflatable airbag cushion; sewing of a fabric panel; folding, bending, compressing, or otherwise disposing an inflatable airbag cushion into a compact form for assembly to a housing, etc. By way of distinction, the phrase "packaged state" refers to a condition of inflatable airbag cushion after assembly of the inflatable airbag cushion to a packing component (e.g., a housing).

Unless otherwise stated, all ranges include both endpoints and all numbers between the endpoints.

FIG. 1 is a side view of a portion of an interior of a vehicle 10 wherein an inflatable airbag assembly 100 is installed, according to an embodiment of the present disclosure. The vehicle 10 comprises a dashboard or instrument panel (dashboard) 11, a windshield 12, and an occupant seating position 30. The occupant seating position 30 comprises an occupant seat 32 and a seatback 34. An occupant 50 is shown seated in the occupant seat 32. The occupant 50 is shown using a seatbelt 40; however, this is for convenience of the disclosure and not by way of limitation. The dashboard 11 and the windshield 12 are disposed in a forward direction relative to the vehicle 10 and the occupant 50. In the present embodiment, the inflatable airbag assembly 100 is installed to a side portion of the seatback 34. The disclosure anticipates that an inflatable airbag assembly may be installed to a different location of the seatback 34, the occupant seat 32, or another portion of the vehicle 10. The inflatable airbag assembly 100 comprises a housing 102 and an inflator 104.

Figure 2:
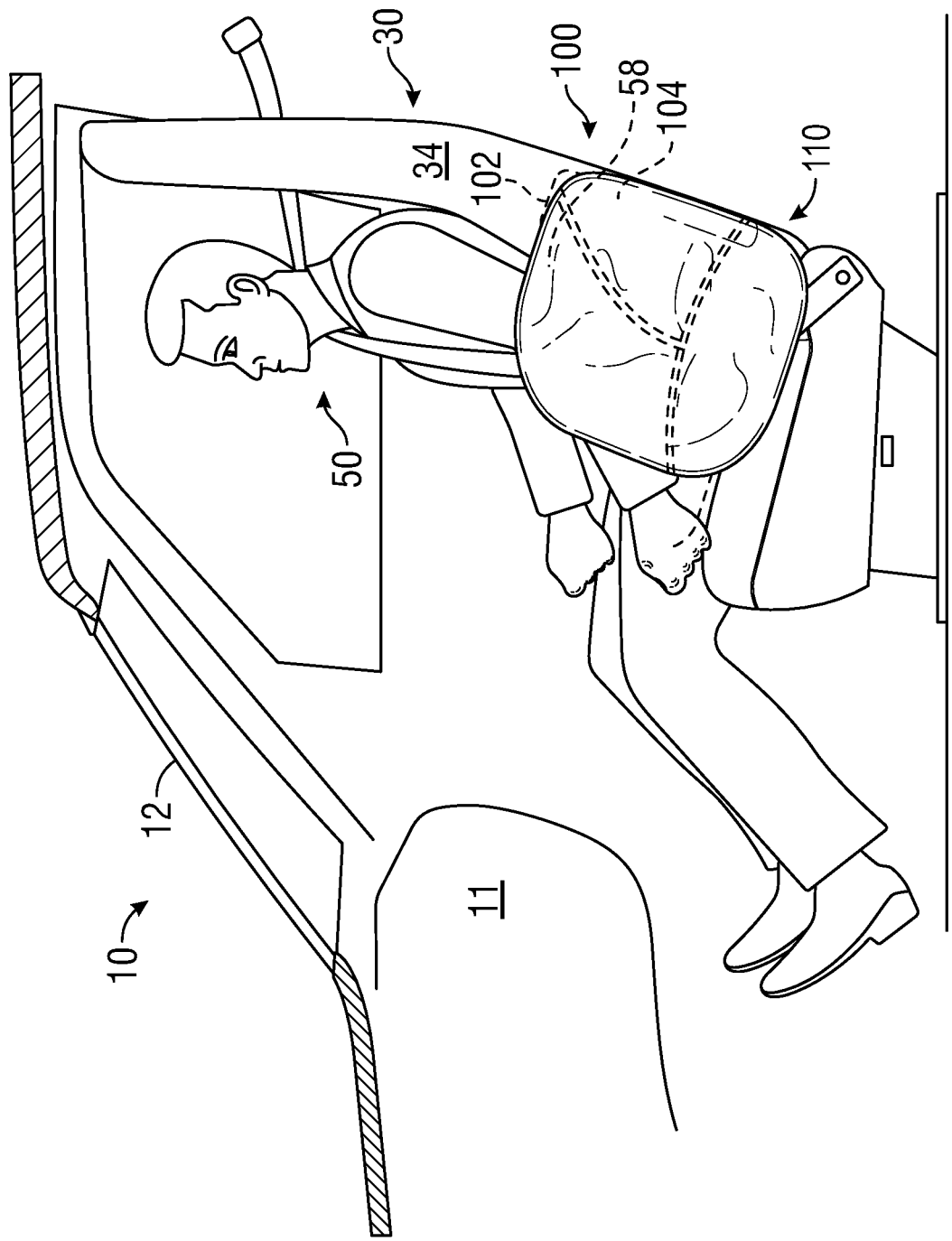
FIG. 2 is a side view of a portion of the interior of the vehicle with the inflatable airbag assembly of FIG. 1 in an at least a partially deployed condition.

FIG. 2 is a side view of a portion of the interior of the vehicle 10 with the inflatable airbag assembly 100 in an at least partially deployed condition, according to an embodiment of the present disclosure. The dashboard 11, the windshield 12, and the seatback 34 of the occupant seating position 30 are identified for reference. The housing 102 and the inflator 104 of the inflatable airbag assembly 100 are shown. An inflatable airbag cushion 110 is shown in an at least partially deployed and inflated condition. The inflatable airbag cushion 110 may have been deployed by activation of the inflator 104 in response to a collision event. In the particular example of FIG. 2, the inflatable airbag cushion 110 may protect to some degree a torso 58 of the occupant 50 from impact with a structure of the vehicle 10, another occupant, etc. The illustration of the inflatable airbag cushion 110 in the particular configuration of FIG. 2 is for convenience of the disclosure and not by way of limitation.

Figure 3:
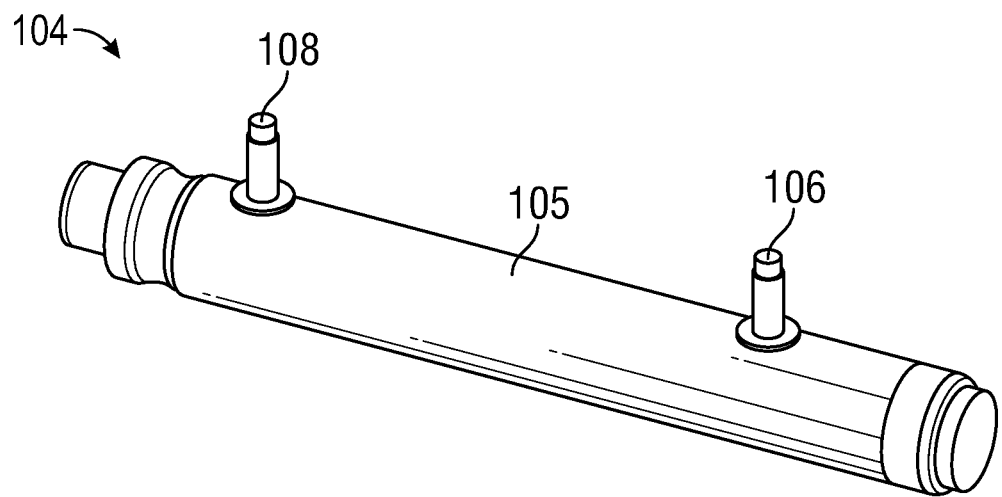
FIG. 3 is a perspective view of an inflator, according to one embodiment of the present disclosure.

FIG. 3 is a perspective view of an inflator 104, according to an embodiment of the present disclosure. The inflator 104 may be similar in some respects to the inflator 104 of FIGS. 1 and 2. The inflator 104 comprises a body 105, a first attachment stud 106, and a second attachment stud 108. The inflator 104 may be configured to be triggered by a collision event whereby an initiator causes a rapid gas generation process with the generated gas directed to an interior portion of an inflatable airbag cushion to cause the inflatable airbag cushion to deploy and inflate. In other words, the inflator 104 supplies inflation gas to and is in fluid communication with the inflatable airbag cushion 110. The attachment studs 106, 108 may serve to couple the inflator, the inflatable airbag cushion 110, and a housing 102 together, and to further couple the inflatable airbag assembly 100 to a structure of the vehicle 10 (see FIGS. 1 and 2).

Figure 4:
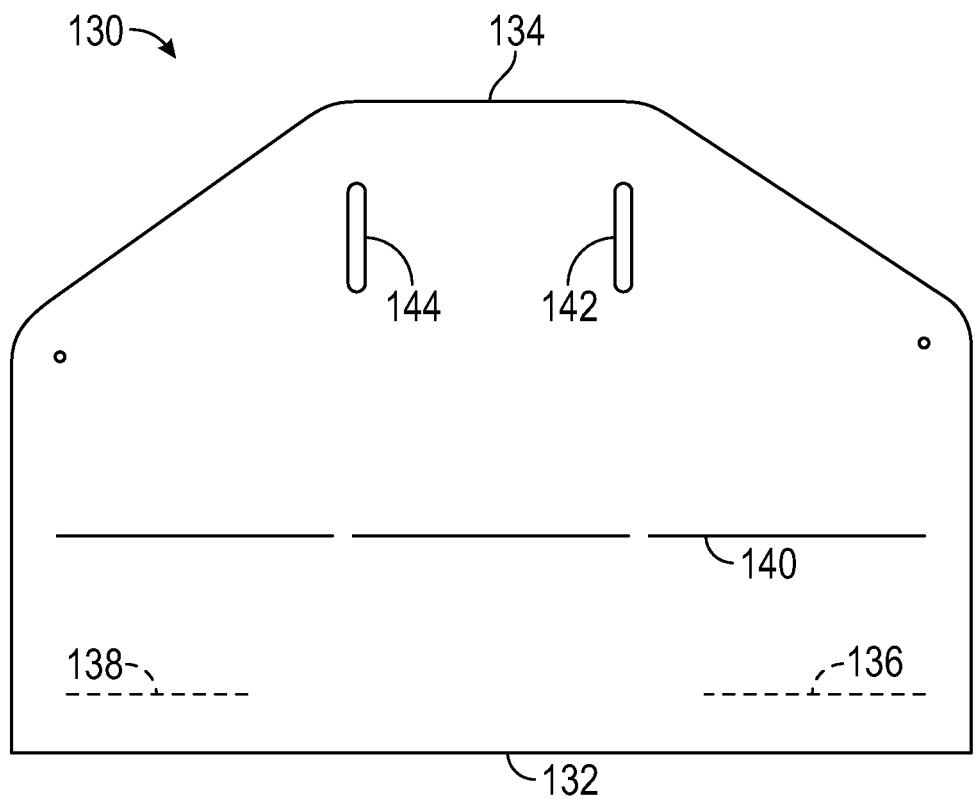
FIG. 4 is a plan view of a securement wrapper for an inflatable airbag assembly, according to one embodiment of the present disclosure.

The housing 102 may comprise two or more wrappers. As discussed below, the housing 120 may include a securement wrapper 130 and a packaging wrapper 150. FIG. 4 is a plan view of the securement wrapper 130 for the inflatable airbag assembly 100 according to an embodiment of the present disclosure. The securement wrapper 130 comprises a first end 132, a second end 134, a burst seam 140, a first aperture 142, and a second aperture 144. A location for a first tack stitch 136 is shown, as is a location for a second tack stitch 138. The burst seam 140 may be disposed at or near the first end 132 of the securement wrapper 130. The burst seam 140 may extend laterally across (or substantially across) the securement wrapper 130. The burst seam 140 may comprise a series of slits configured to burst upon deployment so as to permit the securement wrapper 130 to separate at the burst seam 140 during deployment.

Figure 5:
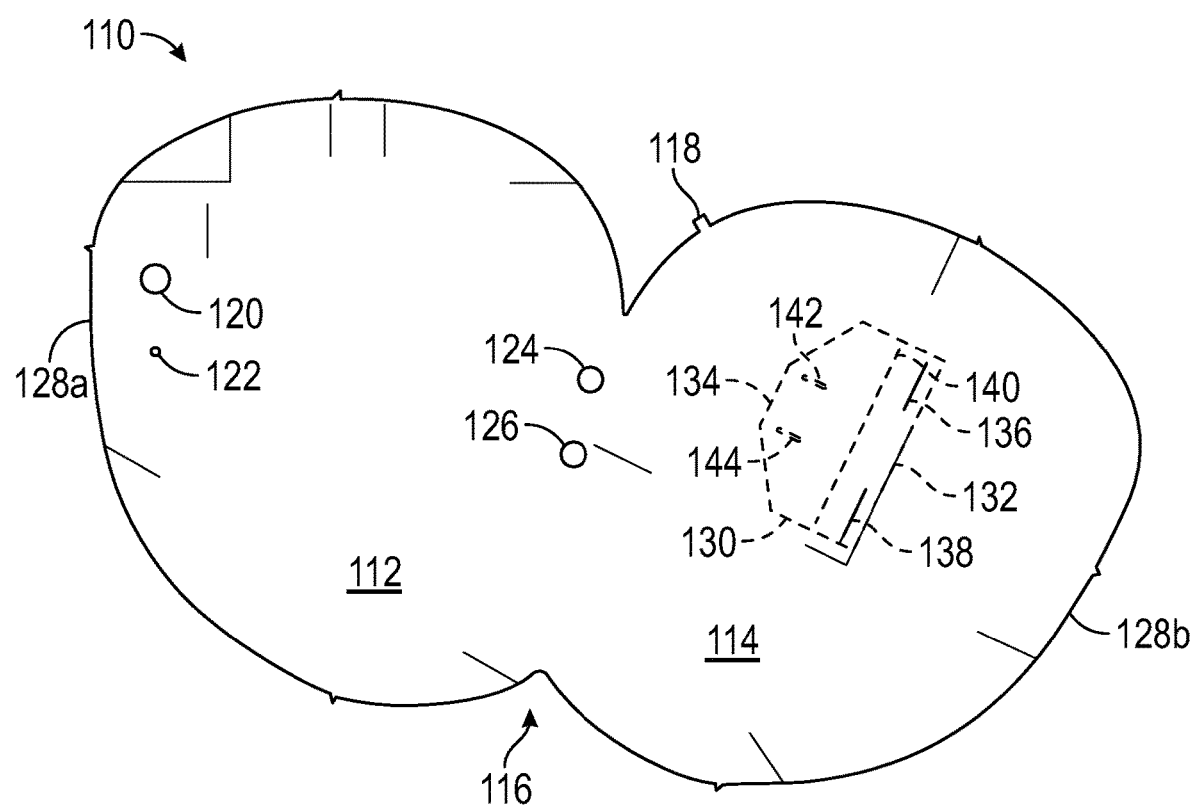
FIG. 5 is a plan view of an inflatable airbag cushion of an inflatable airbag assembly in an unassembled state according to one embodiment of the present disclosure.

FIG. 5 is a plan view of the inflatable airbag cushion 110 of the inflatable airbag assembly 100 in an unassembled state. The inflatable airbag cushion 110 comprises a first panel 112 and a second panel 114. The first and second panels 112, 114 are coupled to each other by a coupling 116. The coupling 116 may be a fold region where the inflatable airbag cushion 110 is folded such that the first and second panels 112, 114 are disposed one atop the other with their perimeters aligned to permit sewing together about a perimeter of the first and second panels 112, 114 to form the inflatable airbag cushion 110. The inflatable airbag cushion 110 is configured such that a first end 128a of the first panel 112 and a first end 128b of the second panel 114 align during assembly of the inflatable airbag cushion 110 and during sewing about a perimeter of the folded inflatable airbag cushion 110. Folding and sewing about the perimeter of the inflatable airbag cushion 110 comprise steps to form a void defined by the first and second panels 112, 114 to receive inflation gas from the inflator 104 during deployment of the inflatable airbag assembly 100 (see FIG. 3). The first panel 112 may comprise a first aperture 120 configured to accommodate the body 105 of the inflator 104 (see FIG. 3). The first panel 112 may further comprise a second aperture 122 configure to accommodate the first attachment stud 106 of the inflator 104 when the body 105 of the inflator 104 has been inserted through the first aperture 120 (see FIG. 3).

The first panel 112 may further comprise a first vent 124 and a second vent 126, the first and second vent 124, 126 configured to exhaust inflation gases from the inflatable airbag cushion 110 during a collision event. The second panel 114 may further comprise a reference tab 118. In one embodiment of the present disclosure, the foldable coupling 116 may be omitted. In one embodiment, there may be more or fewer vents 124, 126, or the vents 124, 126 may be differently disposed. Said otherwise, the shape and configuration of the inflatable airbag cushion 110 in FIG. 5 is for convenience of the disclosure only and not by way of limitation.

The securement wrapper 130 is shown disposed adjacent and below the second panel 114 of the inflatable airbag cushion 110. The first end 132, the second end 134, the burst seam 140, and the first and second apertures 142, 144 are shown for reference. The securement wrapper 130 may be coupled with the second panel 114 by one or more tack stitch(es). For convenience of the present disclosure, a first tack stitch 136 and a second tack stitch 138 are shown coupling the securement wrapper 130 to the second panel 114 of the inflatable airbag cushion 110; however, in at least one embodiment, the tack stitches 136, 138 may be applied after the inflatable airbag cushion 110 has been folded to place the first and second panels 112, 114 atop one another whereby the tack stitches 136, 138 simultaneously couple the securement wrapper 130 to the inflatable airbag cushion 110 and couple the first and second panels 112, 114 together. In one embodiment, there may be only one tack stitch, or more than two tack stitches 136, 138. During assembly of the inflatable airbag cushion 110, the inflatable airbag cushion 110 is configured such that the securement wrapper 130 is disposed at an exterior portion of the assembled inflatable airbag cushion 110.

Figure 6A:
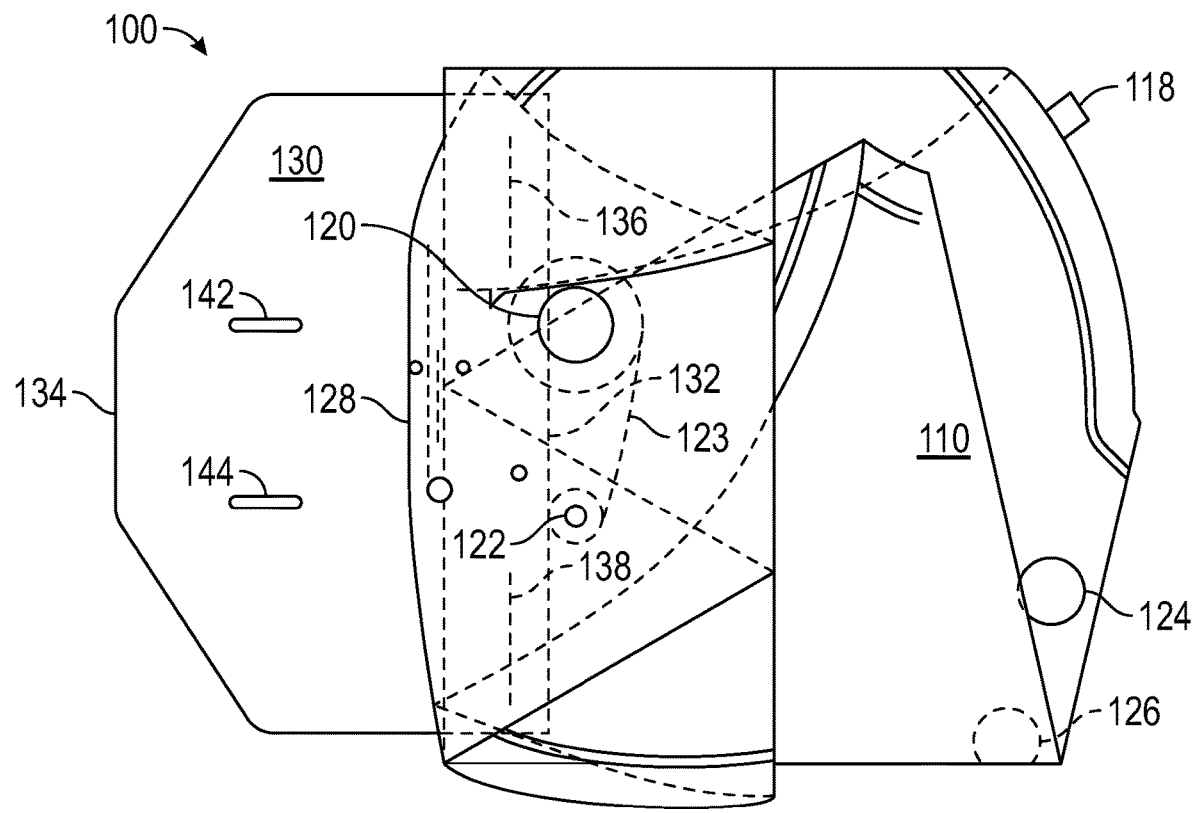
FIG. 6A is plan view of an inflatable airbag cushion of an inflatable airbag assembly in a packaging state according to an embodiment of the present disclosure.

FIG. 6A is plan view of the inflatable airbag cushion 110 of the inflatable airbag assembly 100 in a packaging state. The inflatable airbag cushion 110 has been partially folded to a compact state during a stage of assembly of the inflatable airbag assembly 100. Hereafter, "inflatable airbag cushion" may refer to the inflatable airbag cushion 110 in a packaging state. The reference tab 118, the first and second apertures 120, 122, and the first and second vents 124, 126 of the inflatable airbag cushion 110 are shown for reference. The inflatable airbag cushion 110 may comprise a pocket 123 disposed at or near a first end 128 (the alignment of the first end 128a and 128b) of the inflatable airbag cushion 110. The pocket 123 may be configured to receive the inflator 104 (see FIG. 3). Furthermore, the pocket 123 may be configured to direct inflation gas from the inflator 104 to the void formed between the first and second panels 112, 114 of the inflatable airbag cushion 110 (see FIG. 5). The securement wrapper 130 is coupled to the inflatable airbag cushion 110 at the first tack stitch 136 and the second tack stitch 138. The first and second ends 132, 134 of the securement wrapper 130 are shown for reference. The first and second apertures 142, 144 of the securement wrapper 130 are also shown for reference.

Figure 6B:
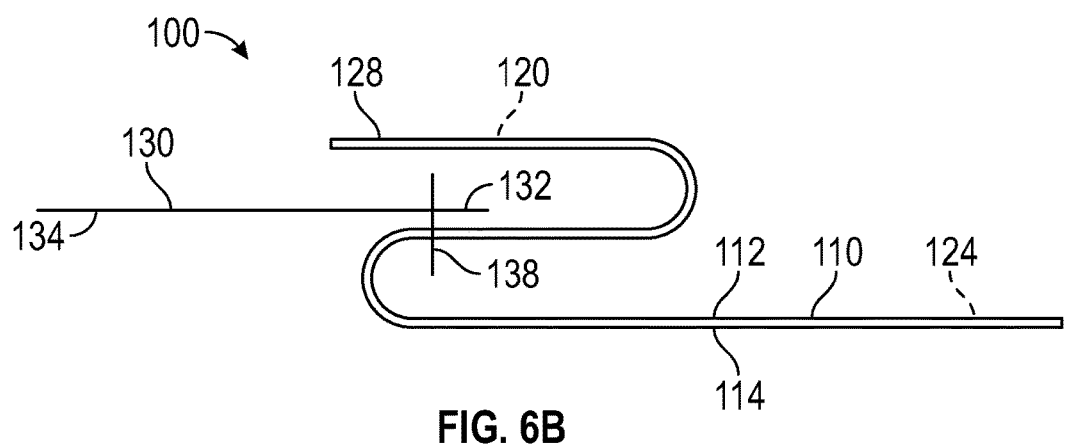
FIG. 6B is a side view of the inflatable airbag cushion of the inflatable airbag assembly of FIG. 6A.

FIG. 6B is a side view of the inflatable airbag cushion 110 of the inflatable airbag assembly 100. More particularly, the side view of FIG. 6B represents the inflatable airbag cushion 110 at the same stage of assembly as shown in FIG. 6A. The first end 128, the first aperture 120, and the first vent 124 of the inflatable airbag cushion 110 are identified for reference. The first end 132 of the securement wrapper 130 is shown coupled to the inflatable airbag cushion 110 at the first tack stitch 136 (see FIG. 6A) and at the second tack stitch 138. More particularly, the first and second tack stitches 136, 138 couple the first end 132 of the securement wrapper 130 to the first panel 112 of the inflatable airbag cushion 110. In one embodiment, the first tack stitch 136 and/or the second tack stitch 138 may further simultaneously couple the first and second panels 112, 114. The second end 134 of the securement wrapper 130, at this stage of assembly, is shown extending away from the inflatable airbag cushion 110.

Figure 7:
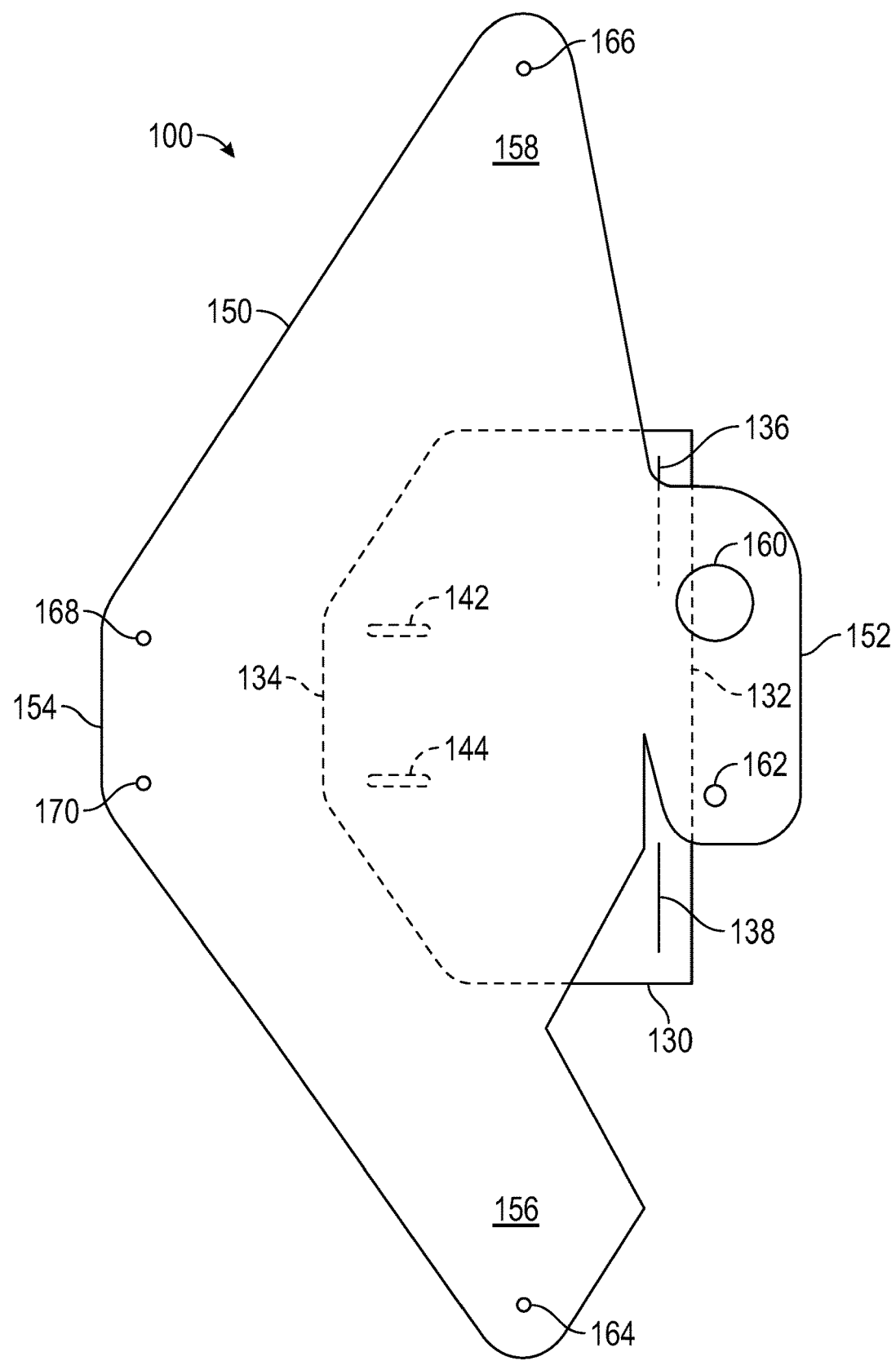
FIG. 7 is a plan view of a securement wrapper and a packaging wrapper of an inflatable airbag, according to an embodiment of the present disclosure.

FIG. 7 is a plan view of the securement wrapper 130 and a packaging wrapper 150 of the inflatable airbag assembly 100. The securement wrapper 130 and the packaging wrapper 150 are shown aligned as during assembly of the inflatable airbag assembly 100, but with the inflatable airbag cushion 110 omitted for convenience of the disclosure. The first and second ends 132, 134, the first and second tack stitches 136, 138, and the first and second apertures 142, 144 of the securement wrapper 130 are shown for reference. The packaging wrapper 150 comprises a first end 152 and a second end 154. A first aperture 160 and a second aperture 162 are disposed at or near the first end 152. The first aperture 160 may be configured to accommodate the body 105 of the inflator 104, and the second aperture 162 may be configured to receive (or slide onto) the second attachment stud 108 of the inflator 104 (see FIG. 3). The packaging wrapper 150 further comprises a first lateral wing 156 and a second lateral wing 158. The first lateral wing 156 comprises a third aperture 164. The second lateral wing 158 comprises a fourth aperture 166. The packaging wrapper 150 further comprises a fifth aperture 168 and a sixth aperture 170 disposed near the second end of the packaging wrapper 150. The fifth and sixth apertures 168, 170 may be configured to slide onto, respectively, the first attachment stud 106 and the second attachment 108 of the inflator 104 (see FIG. 3).

Figure 8A:
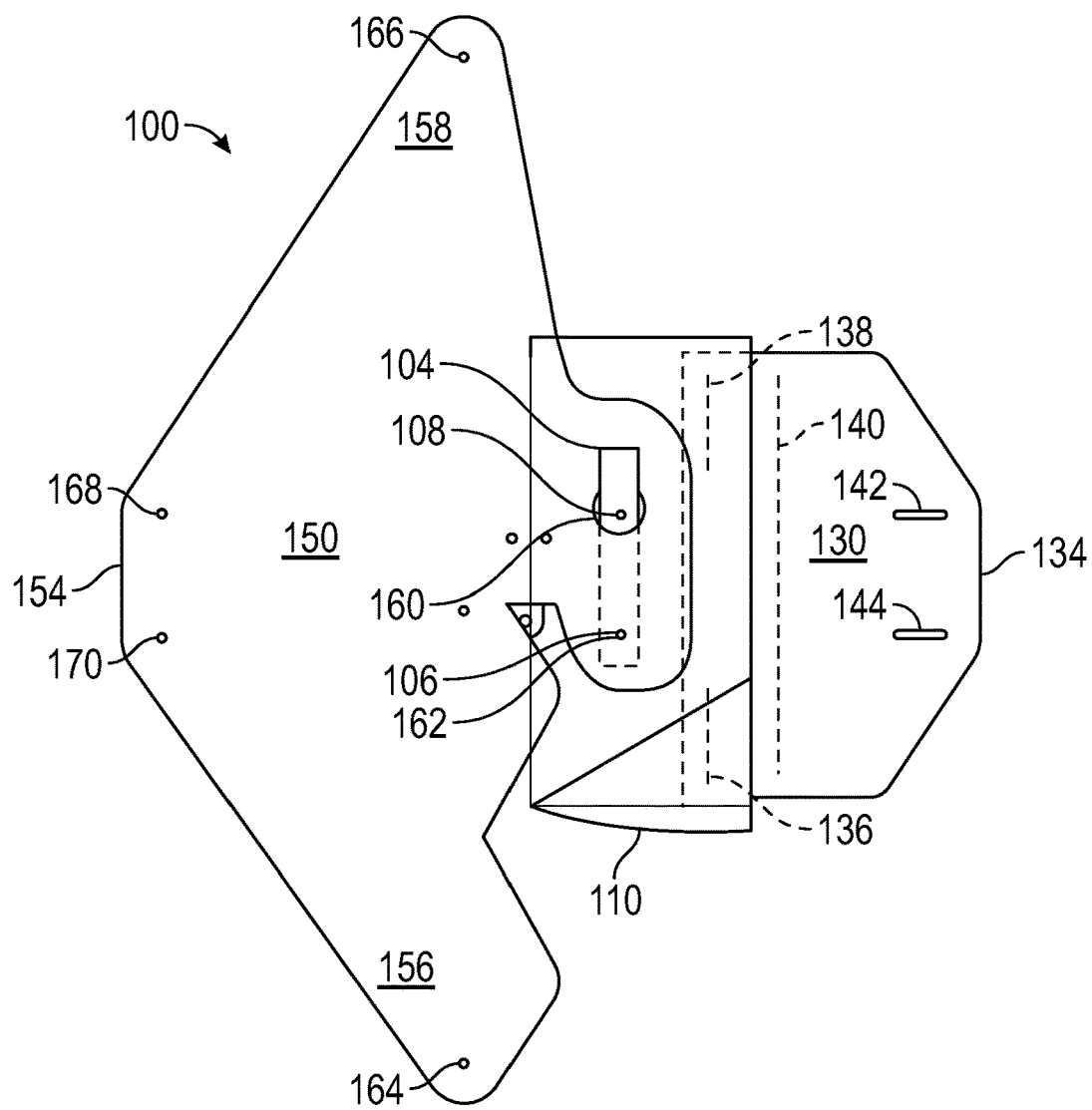
FIG. 8A is a plan view of an inflatable airbag assembly in a packaging state, according to an embodiment of the present disclosure.
Figure 8B:
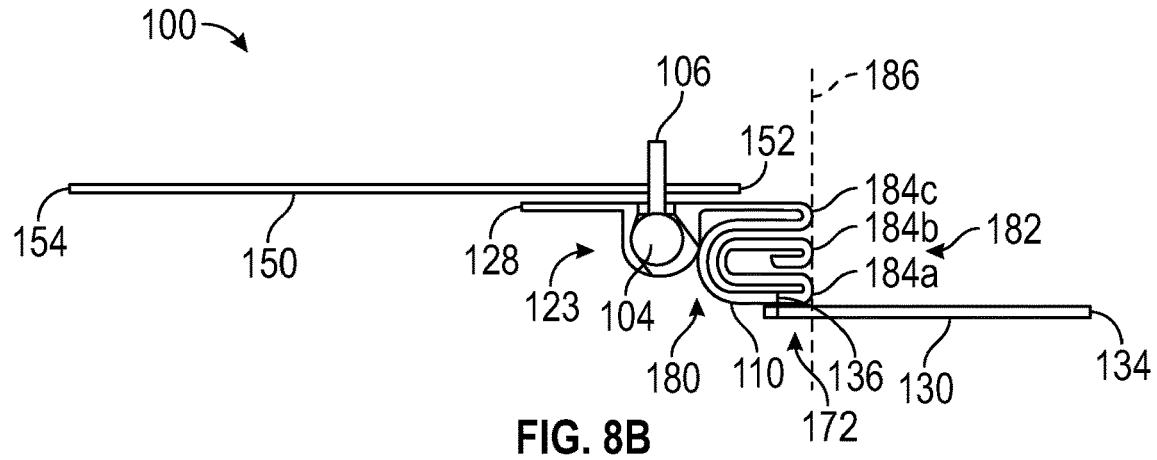
FIG. 8B is a side view of the inflatable airbag assembly of FIG. 8A at the same packaging state.

FIG. 8A is a plan view of the inflatable airbag assembly 100 in a packaging state, according to an embodiment of the present disclosure. FIG. 8B is a side view of the inflatable airbag assembly 100 of 8A at the same packaging state. For ease of disclosure, FIGS. 8A and 8B are described together. The packaging state shown in FIGS. 8A and 8B represents an assembly stage wherein the securement wrapper 130 has been coupled to the inflatable airbag cushion 110, the inflator 104 has been disposed in the pocket 123 of the inflatable airbag cushion 110, and the packaging wrapper 150 has been disposed at the inflatable airbag cushion 110 by positioning the inflator 104 through the first aperture 160 of the packaging wrapper 150 with the first attachment stud 106 exposed at the first aperture 160 of the packaging wrapper 150, and the second aperture 162 of the packaging wrapper 150 has been slid onto the second attachment stud 108 of the inflator 104. The second end 134 of the securement wrapper 130, as well as the burst seam 140 and the first and second apertures 142, 144 are shown for reference. The securement wrapper 130 has been coupled by the tack stitches 136, 138 to the inflatable airbag cushion 110 at a first side 172 of the inflatable airbag cushion 110. The first end 128 of the inflatable airbag cushion 110 is shown for reference. The first end 152, the first and second lateral wings 156, 158, and the second end 154 are shown for reference, along with their respective apertures 160, 162, 164, 166, 168, 170.

The inflatable airbag cushion 110 has been compacted, in the present example, by a U shape fold 180. However, the inflatable airbag cushion 110 may be compacted in variety of other ways. The U shape fold 180 forms three distinct folds 182. The three distinct folds 182 form three tips 184a, 184b, 184c. The three tips 184a-184c are disposed in a single plane 186 (e.g., all three tips are in the same plane). Absent the securement wrapper 130, the next step of assembly would involve wrapping the packaging wrapper 150 around the first side 172 of the inflatable airbag cushion 110, past the three tips 184a-184c, and to attachment studs 106, 108; however, this procedure frequently results in the three tips 184a-184c becoming misaligned (no longer in the single plane 186). Such misalignment creates a risk that the inflatable airbag cushion 110 will deploy incorrectly or inconsistently with a desired deployment trajectory. The present disclosure substantially reduces the possibility of incorrect deployment resulting from the misalignment of the tips 184a-184c.

Figure 9A:
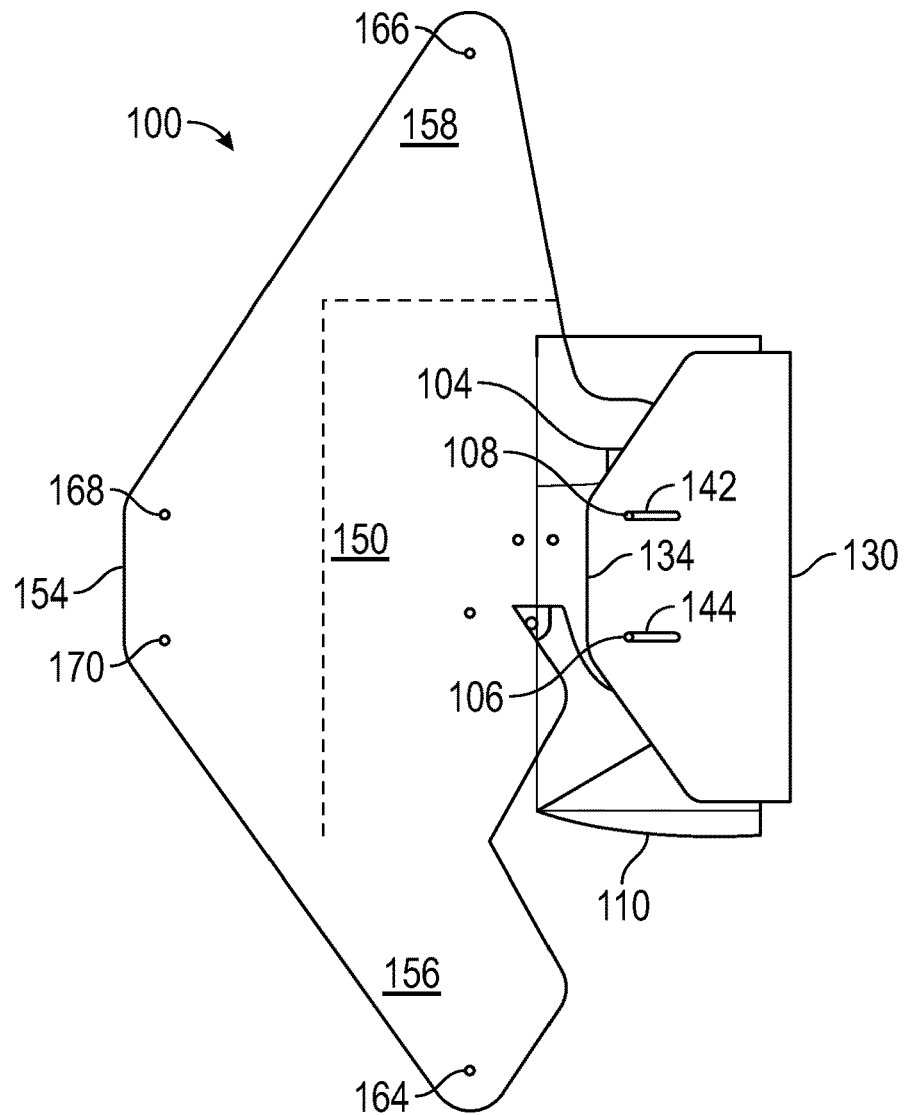
FIG. 9A is a plan view of the inflatable airbag assembly of FIGS. 8A and 8B in a packaging state subsequent to the packaging state of FIGS. 8A and 8B.
Figure 9B:
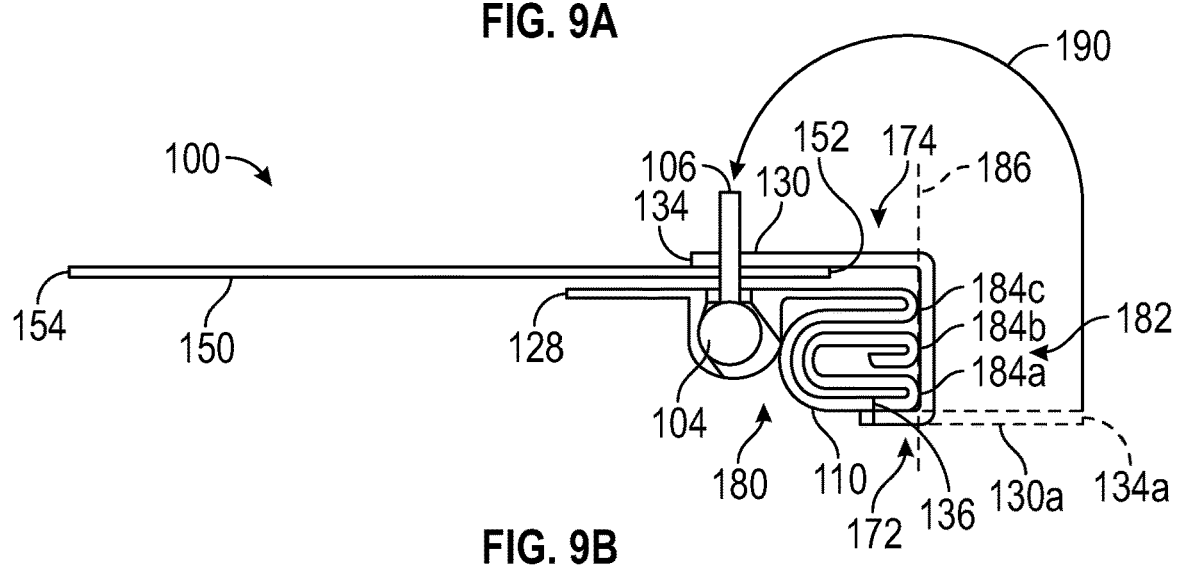
FIG. 9B is a side view of the inflatable airbag assembly of FIG. 9A at the same packaging state.

FIG. 9A is a plan view of the inflatable airbag assembly 100 in a packaging state subsequent to the packaging state of FIGS. 8A and 8B. FIG. 9B is a side view of the inflatable airbag assembly 100 of FIG. 9A at the same packaging state. For ease of disclosure, FIGS. 9A and 9B are described together. The packaging wrapper 150 is shown, with the second end 154, the first and second lateral wings 156, 158, and the third, fourth, fifth, and sixth apertures 164-170. The inflator 104 and the first and second attachment studs 106, 108 are identified. The securement wrapper 130 is coupled at the first side 172 inflatable airbag cushion 110 in the packaging state via the tack stitches 136, 138. The securement wrapper 130 has been wrapped 190 from its initial disposition 130a around the inflatable airbag cushion 110 in the packaging state. The first aperture 142 has been disposed or slid onto the first attachment stud 106, and the second aperture 144 has been disposed or slid onto the second attachment stud 108. Wrapping 190 the securement wrapper 130 around the inflatable airbag cushion 110 in the packaging state moves the second end 134 from its initial position 134a to a position at or near a second side 174 of the inflatable airbag cushion 110 in the packaging state. Furthermore, wrapping 190 the securement wrapper 130 around the inflatable airbag cushion 110 in the packaging state retains the tips 184a-184c in the single plane 186. With the securement wrapper 130 disposed as shown in FIGS. 9A and 9B, the packaging wrapper 150 can be further disposed (as shown in FIGS. 10A-11B) about the inflatable airbag cushion 110 without disturbing the tips 184a-184c from a common plane (e.g., the single plane 186). Retaining the tips 184a-184c in the single plane 186 in the subsequent assembly stages provides substantially more reliable deployment of the inflatable airbag cushion 110 during a collision event.

Figure 10A:
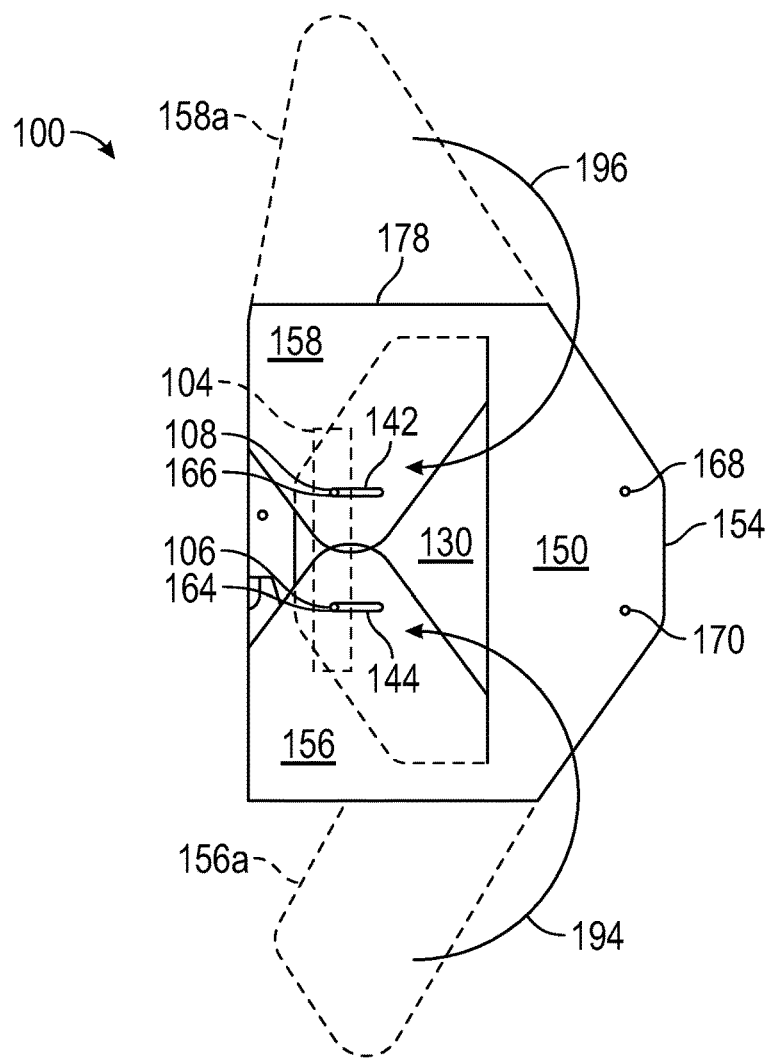
FIG. 10A is a plan view of the inflatable airbag assembly of FIGS. 8A-9B in a packaging state subsequent to the packaging state of FIGS. 9A and 9B.
Figure 10B:
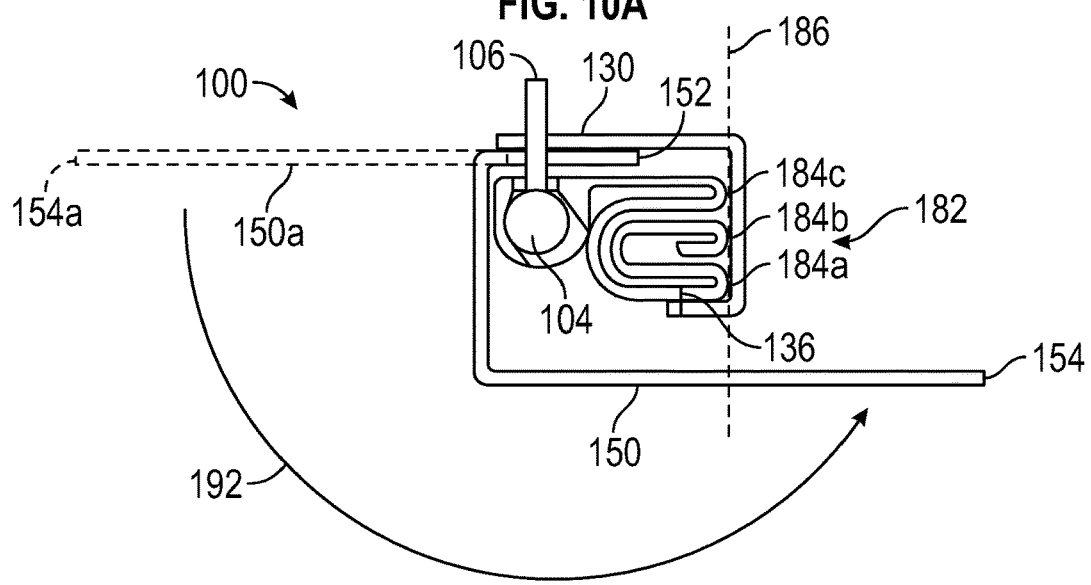
FIG. 10B is a side view of the inflatable airbag assembly of FIG. 10A at the same packaging state.

FIG. 10A is a plan view of the inflatable airbag assembly 100 of FIGS. 8A-9B in a packaging state subsequent to the packaging state of FIGS. 9A and 9B. FIG. 10B is a side view of the inflatable airbag assembly 100 of FIG. 10A at the same packaging state. For ease of disclosure, FIGS. 10A and 10B are described together. The securement wrapper 130 is shown having been wrapped around the inflatable airbag cushion 110 and with the first and second apertures 142, 144 coupled to the first and second attachment studs 106, 108, respectively, to retain the tips 184a-184c of the three distinct folds 182 in the single plane 186. A first fold 192 of the packaging wrapper 150 is applied to transition the packaging wrapper 150 from an initial disposition 150a to an intermediate disposition shown in FIGS. 9A and 9B. The first and second ends 152, 154 of the packaging wrapper 150 and the fifth and sixth apertures 168, 170 are shown for reference. An intermediate position 154a of the second end 154 is also shown for reference. The first lateral wing 156 is folded 194 from an intermediate position 156a at a first lateral side 176 of the inflatable airbag cushion 110 in the packaging state. The second lateral wing 158 is folded 196 from an intermediate position 158a at a second lateral side 178 of the inflatable airbag cushion 110 in the packaging state. The respective intermediate positions 156a, 158a of the first and second lateral wings 156, 158 are achieved by the first fold 192 of the packaging wrapper 150. In FIG. 10B, the first lateral wing 156 is omitted to permit illustration of the inflatable airbag cushion 110. The third aperture 164 is slid onto the first attachment stud 106 of the inflator 104 to dispose the first lateral wing 156 about the inflatable airbag cushion 110 in the packaging state. The fourth aperture 166 is slid onto the second attachment stud 108 of the inflator 104 to dispose the second lateral wing 158 about the inflatable airbag cushion 110 in the packaging state. During the folds 192, 194, the securement wrapper 130 retains the tips 184a-184c of the three distinct folds 182 in the single plane 186. Retaining the tips 184a-184c in the single plane 186 in the subsequent assembly stages provides substantially more reliable deployment of the inflatable airbag cushion 110 during a collision event.

Figure 11A:
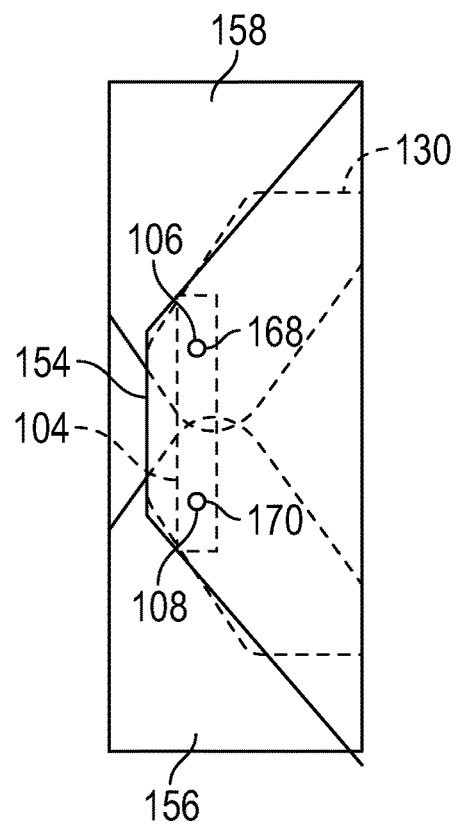
FIG. 11A is a plan view of the inflatable airbag assembly of FIGS. 8A-10B in a packaging state subsequent to the packaging state of FIGS. 10A and 10B.
Figure 11B:
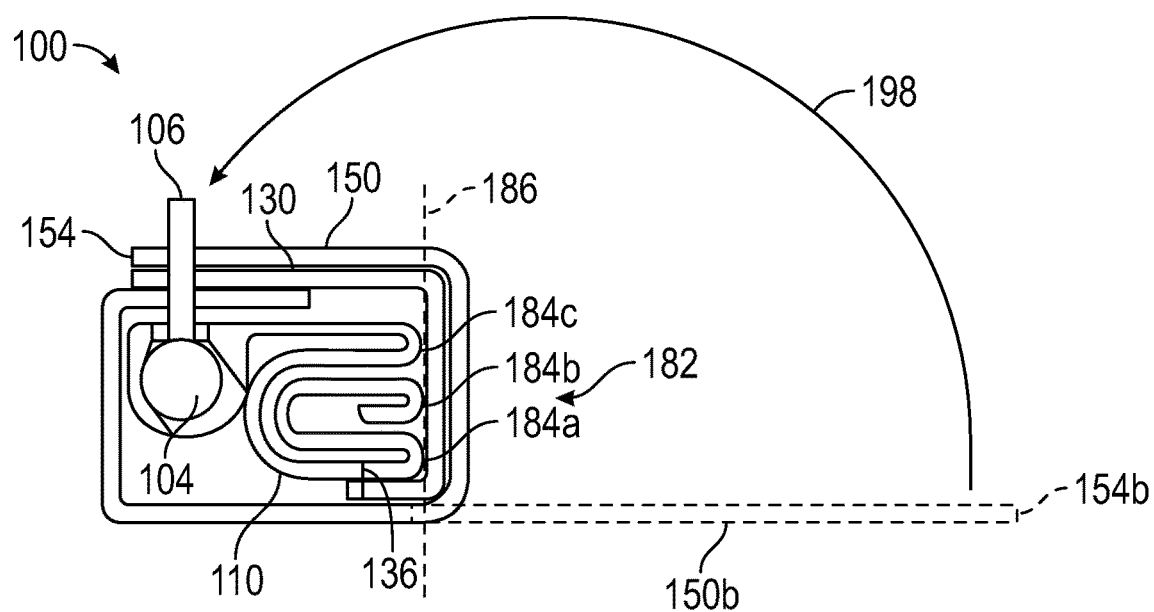
FIG. 11B is a side view of the inflatable airbag assembly of FIG. 11A at the same packaging state.

FIG. 11A is a plan view of the inflatable airbag assembly 100 of FIGS. 8A-10B in a packaging state subsequent to the packaging state of FIGS. 10A and 10B. FIG. 11B is a side view of the inflatable airbag assembly 100 of FIG. 11A at the same packaging state. For ease of disclosure, FIGS. 11A and 11B are described together. For convenience of the disclosure, the first lateral wing 156 is omitted in FIG. 11B to permit illustration of the inflatable airbag cushion 110. The securement wrapper 130 remains disposed about the inflatable airbag cushion 110 in the packaging state. A fold 198 of the packaging wrapper 150 and the second end 154 of the packaging wrapper 150 from an intermediate position 150b, 154b disposes the packaging wrapper 150 further about the inflatable airbag cushion 110 in the packaging state and the securement wrapper 130. The fifth and sixth apertures 168, 170 slide onto the first and second attachment studs 106, 108, respectively, of the inflator 104 to dispose the packaging wrapper 150 about the inflatable airbag cushion 110 in the packaging state. The disposition of the securement wrapper 130 about the inflatable airbag cushion 110 in the packaging state retains the tips 184a-184c of the three distinct folds 182 in the single plane 186. Retaining the tips 184a-184c in the single plane 186 may provide substantially more reliable deployment of the inflatable airbag cushion 110 during a collision event.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

It should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly comprising:
   an inflatable airbag cushion in a packaging state with a first end and a second end;
   an inflator near the first end of the inflatable airbag cushion in the packaging state and in fluid communication with the inflatable airbag cushion to supply inflation gas to inflate the inflatable airbag cushion upon deployment, the inflator further comprising attachment studs;
   a securement wrapper with a first end and a second end, the first end of the securement wrapper coupled to a first side of the inflatable airbag cushion in the packaging state, the securement wrapper wrapped around the second end of the inflatable airbag cushion in the packaging state, and the second end of the securement wrapper coupled to a second side of the inflatable airbag cushion in the packaging state thereby securing the second end of the inflatable airbag cushion in the packaging state; and
   a packaging wrapper configured to encompass the inflatable airbag cushion in the packaging state and the securement wrapper.

2. The inflatable airbag assembly of claim 1, wherein the first end of the securement wrapper is coupled to the first side of the inflatable airbag cushion in the packaging state via a tack stitch.

3. The inflatable airbag assembly of claim 2, wherein the tack stitch simultaneously couples a first panel of the inflatable airbag cushion to a second panel of the inflatable airbag cushion.

4. The inflatable airbag assembly of claim 1, wherein the second end of the securement wrapper comprises apertures that are configured to slide on the attachment studs of the inflator to couple the second end of the securement wrapper to the second side of the inflatable airbag cushion in the packaging state.

5. The inflatable airbag assembly of claim 1, wherein the inflatable airbag cushion in the packaging state is folded in a U shape with three distinct folds disposed at the second end of the inflatable airbag cushion in the packaging state.

6. The inflatable airbag assembly of claim 5, wherein tips of the three distinct folds are disposed at the second end of the inflatable airbag cushion in the packaging state are disposed in a single plane.

7. The inflatable airbag assembly of claim 1, wherein the securement wrapper further comprises a burst seam that is configured to burst upon deployment of the inflatable airbag cushion.

8. The inflatable airbag assembly of claim 7, wherein the burst seam is a series of slits that extend laterally across the securement wrapper.

9. The inflatable airbag assembly of claim 7, wherein the burst seam extends laterally across the securement wrapper and the burst seam is disposed at the first end of the inflatable airbag cushion in the packaging state.

10. The inflatable airbag assembly of claim 1, wherein the securement wrapper extends laterally a majority of a lateral length of the second end of the inflatable airbag cushion in the packaging state.

11. The inflatable airbag assembly of claim 1, wherein the inflatable airbag cushion comprises a pocket near the first end of the inflatable airbag cushion to at least partially house the inflator.

12. The inflatable airbag assembly of claim 1, wherein the attachment studs extend out of the inflatable airbag cushion.

13. The inflatable airbag assembly of claim 1, wherein the packaging wrapper comprises a first end and a second end, wherein the first end of the packaging wrapper is coupled to the attachment studs on the first side of the inflatable airbag cushion in the packaging state and the packaging wrapper is wrapped around the first end and the second of end of inflatable airbag cushion in the packaging state and the second end of the packaging wrapper is coupled to the attachment studs on the first side of the inflatable airbag cushion in the packaging state.

14. The inflatable airbag cushion of claim 13, wherein the packaging wrapper comprises a first lateral wing and a second lateral wing, the first lateral wing is wrapped around a first lateral side of the inflatable airbag cushion in the packaging state and the second lateral wing is wrapped around a second lateral side of the inflatable airbag cushion in the packaging state.

15. The inflatable airbag assembly of claim 14, wherein the first lateral wing and the second lateral wing comprise apertures that are configured to slide on the attachment studs of the inflator to couple the first lateral wing of the packaging wrapper to the second side of the inflatable airbag cushion in the packaging state and the second lateral wing of the packaging wrapper to the second side of the inflatable airbag cushion in the packaging state.

16. An inflatable airbag assembly comprising:
    an inflatable airbag cushion in a packaging state with a first end and a second end, the inflatable airbag cushion in the packaging state folded in a U shape fold in which the inflatable airbag cushion is a folded back on itself two times such that the second end of the inflatable airbag cushion in the packaging state comprises three distinct folds disposed at the second end of the inflatable airbag cushion in the packaging state;
    a securement wrapper with a first end and a second end, the first end of the securement wrapper coupled to a first side of the inflatable airbag cushion in the packaging state, the securement wrapper wrapped around the second end of the inflatable airbag cushion in the packaging state, and the second end of the securement wrapper coupled to a second side of the inflatable airbag cushion in the packaging state thereby securing the second end of the inflatable airbag cushion in the packaging state; and a packaging wrapper configured to encompass the inflatable airbag cushion in the packaging state and the securement wrapper.

17. The inflatable airbag assembly of claim 16, wherein tips of the three distinct folds are disposed at the second end of the inflatable airbag cushion in the packaging state and are secured in a common plane by the securement wrapper.

18. The inflatable airbag assembly of claim 16, wherein the securement wrapper further comprises a burst seam that is configured to burst upon deployment of the inflatable airbag cushion.

19. The inflatable airbag assembly of claim 18, wherein the burst seam is a series of slits that extend laterally across the securement wrapper and is disposed at the second end of the inflatable airbag cushion in the packaging state.

20. The inflatable airbag assembly of claim 16, wherein the packaging wrapper comprises a first end and a second end, wherein the first end of the packaging wrapper is coupled to the first side of the inflatable airbag cushion in the packaging state and the packaging wrapper is wrapped around the first end and the second end of the inflatable airbag cushion in the packaging state and the second end of the packaging wrapper is coupled to the first side of the inflatable airbag cushion in the packaging state, and wherein the packaging wrapper comprises a first lateral wing and a second lateral wing, the first lateral wing wrapped around a first lateral side of the inflatable airbag cushion in the packaging state and the second lateral wing wrapped around a second lateral side of the inflatable airbag cushion in the packaging state.

* * * * *